BERNARD OTTO
INVENTOR

BERNARD OTTO
INVENTOR

Sept. 23, 1969                        B. OTTO                        3,467,984
                     REPETITIVE PNEUMATIC ACOUSTIC SOURCE FOR
                             MARINE SEISMIC SURVEYING
Filed Aug. 28, 1967                                         9 Sheets-Sheet 4

BERNARD OTTO
INVENTOR

BY Arthur F. Zobel
ATTORNEY

Sept. 23, 1969 B. OTTO 3,467,984
REPETITIVE PNEUMATIC ACOUSTIC SOURCE FOR
MARINE SEISMIC SURVEYING
Filed Aug. 28, 1967 9 Sheets-Sheet 5

WATER SLOTS

BERNARD OTTO
INVENTOR

BY Arthur F. Zobal
ATTORNEY

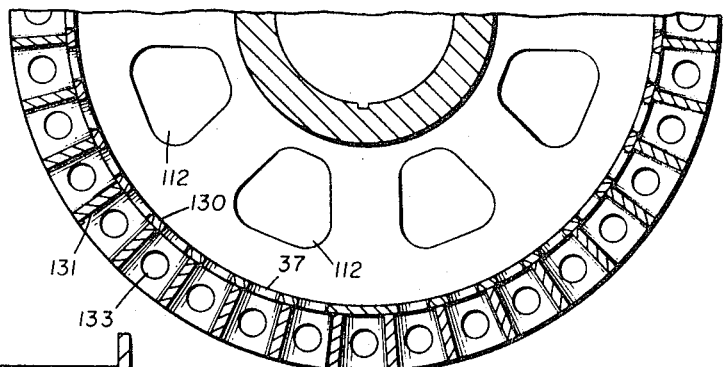
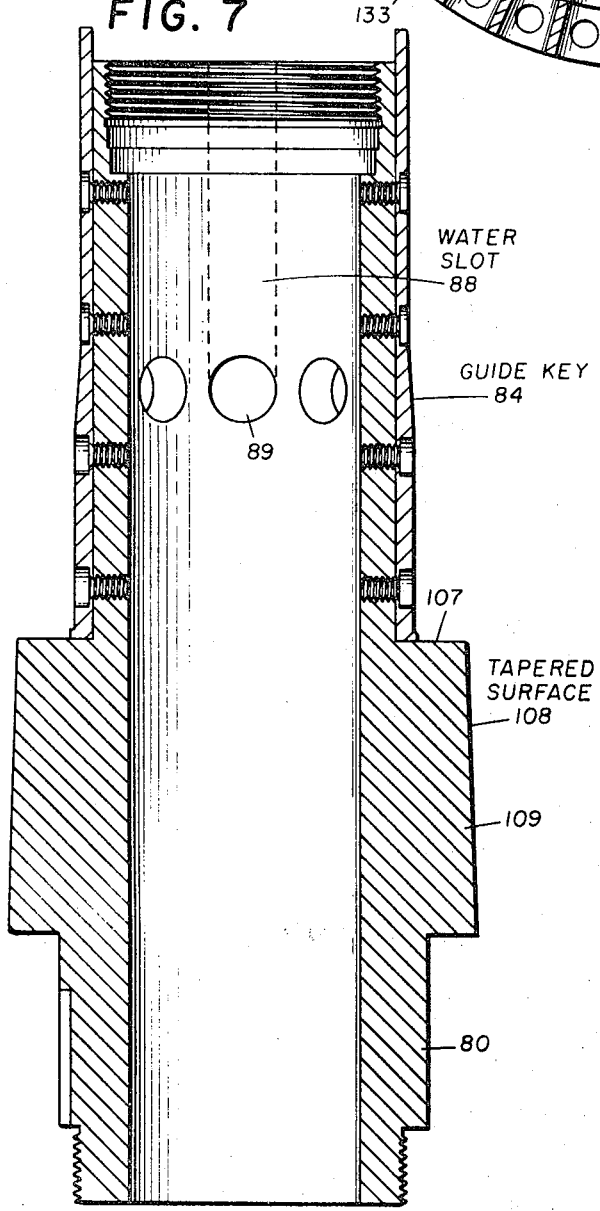
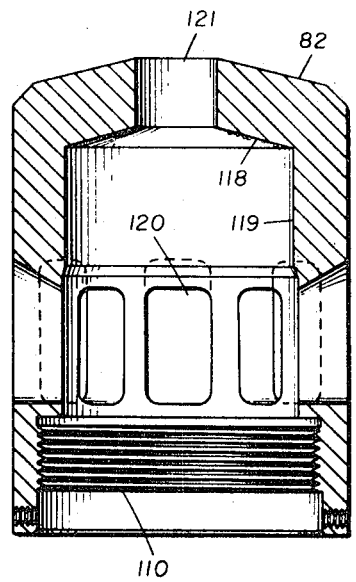
BERNARD OTTO
INVENTOR

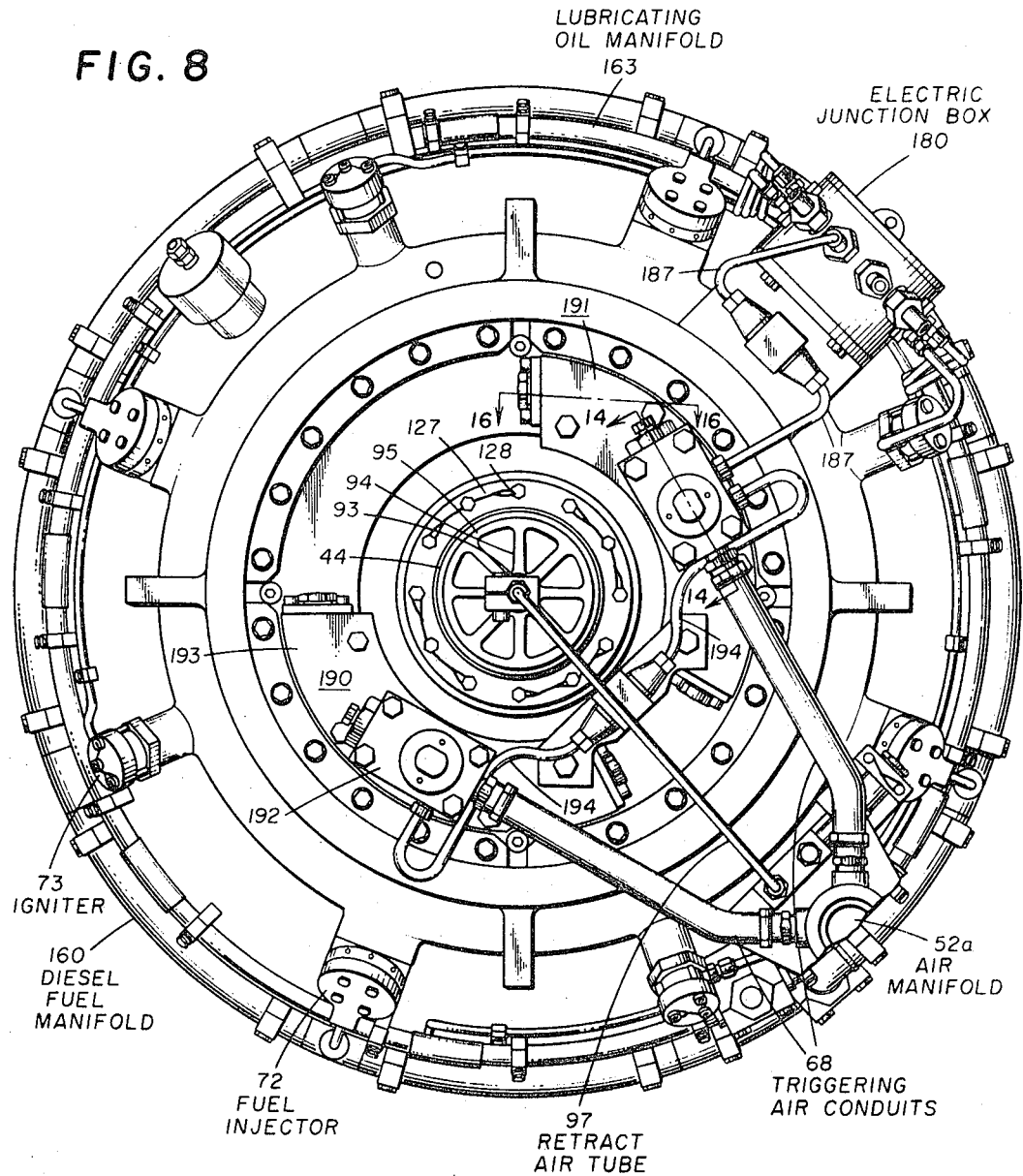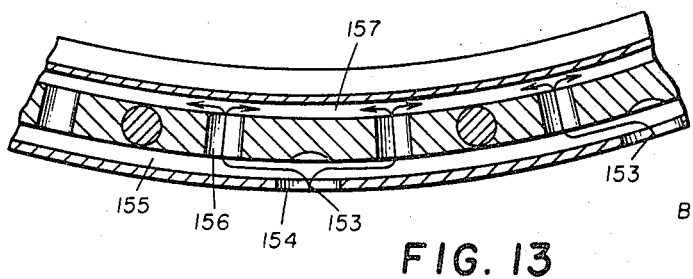
BERNARD OTTO
INVENTOR

Sept. 23, 1969  B. OTTO  3,467,984
REPETITIVE PNEUMATIC ACOUSTIC SOURCE FOR
MARINE SEISMIC SURVEYING
Filed Aug. 28, 1967  9 Sheets-Sheet 8
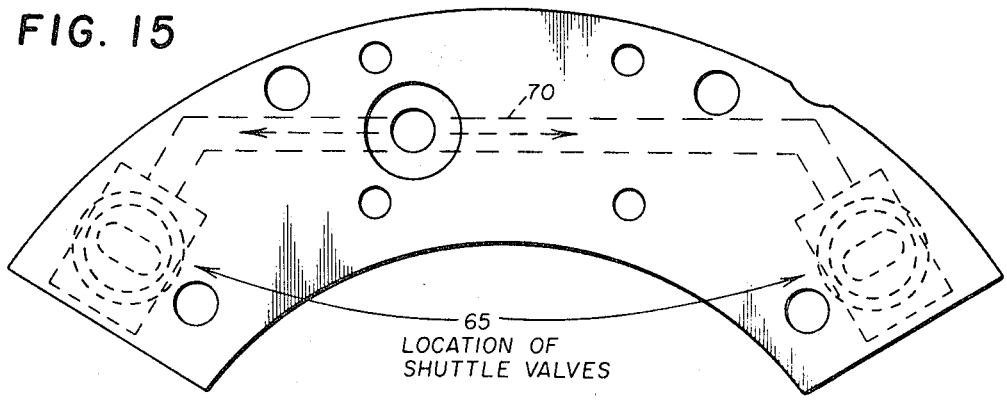
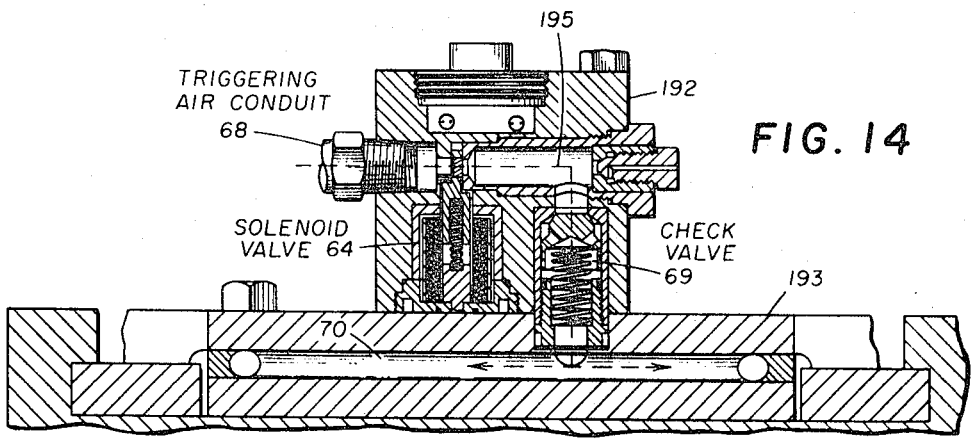
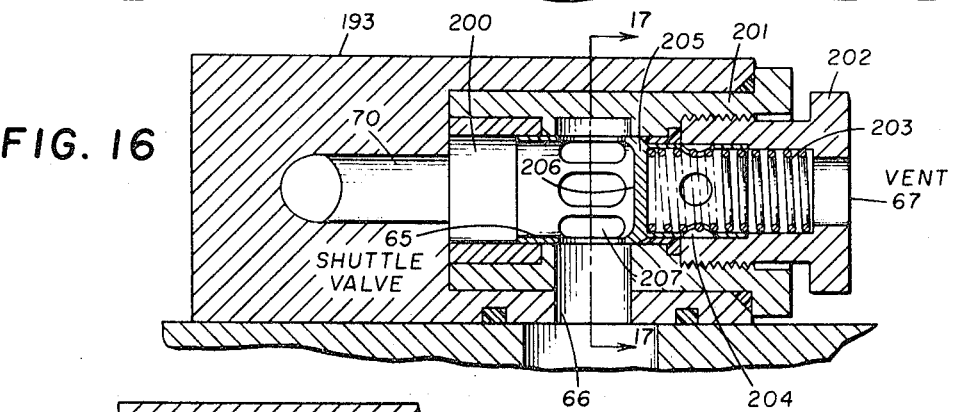
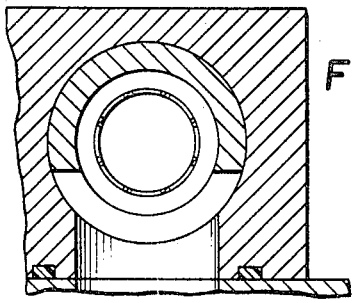
BERNARD OTTO
INVENTOR
BY Arthur F. Zobel
ATTORNEY

BERNARD OTTO
INVENTOR

BY Arthur F. Zobel
ATTORNEY

United States Patent Office 3,467,984
Patented Sept. 23, 1969

3,467,984
REPETITIVE PNEUMATIC ACOUSTIC SOURCE FOR MARINE SEISMIC SURVEYING
Bernard Otto, Arlington, Tex., assignor to Mobil Oil Corporation, a corporation of New York
Filed Aug. 28, 1967, Ser. No. 663,676
Int. Cl. G10k 11/00
U.S. Cl. 181—.5                                    27 Claims

ABSTRACT OF THE DISCLOSURE

The specification discloses a repetitive marine acoustic source formed by a rigid chamber for confining high pressure gases and having a controllable spool-shaped valve for rapidly releasing the high pressure gases into the water to generate an acoustic pulse. The valve has an aperture extending axially therethrough which is open to the water and in addition has valve retract and deceleration mechanisms located therein. The high pressure gases may be formed by burning a combustible mixture in the chamber. In this embodiment the member connecting the two rims of the spool-shaped valve is cooled by direct contact with the water in the aperture. The lower rim also is cooled by water while the upper rim is cooled by the air injected into the chamber to form the combustible mixture.

BACKGROUND OF THE INVENTION

This invention relates to a compact and shock-resistant marine pneumatic acoustic source for confining a large amount of gas at high pressure for release into the water to generate high energy acoustic pulses for exploratory purposes.

In United States patent application Ser. No. 534,130, filed Mar. 14, 1966, by George B. Loper, now U.S. Patent No. 3,397,755, and assigned to the same assignee as that of the present invention, there is disclosed a repetitive pneumatic acoustic source for marine seismic operations and which comprises a rigid chamber having an outlet port which is opened and closed by a fast-acting, spool-shaped valve. In operation, the valve is moved to close the port and the chamber is pressurized with high gas pressure. The valve then is actuated to open rapidly the port to allow the pressurized gas to be released rapidly into the water to generate an acoustic pulse. The cycle is periodically repeated to generate repetitive acoustic pulses in water.

In the development of the source of the type mentioned above, for optimum performance, it was desired to have a large chamber capable of holding a large amount of gas for the production of high energy acoustic pulses in water. Not only was a large source desired, but one that was compact and rugged in order to facilitate handling and to withstand the high energy shock waves generated.

SUMMARY OF THE INVENTION

In accordance with the present invention, there is provided a unique pneumatic acoustic source which meets the requirements stated above. The source comprises an annular chamber formed by outer wall structure and having an outlet port to be coupled to water. Valve means is provided for opening and closing the port. This valve includes a tubular or elongated member having an aperture extending axially therethrough. Means is provided for supporting this member for extension centrally of the outer wall structure for forming the inner wall structure of the chamber when the valve means is in a closed position. In the closed position, the interior of the tubular member is directly exposed to water in which the source is immersed. Means is provided for introducing a fluid into the annular chamber when the valve means is in a closed position for forming a high gas pressure in the chamber greater than the hydrostatic pressure of the water at the outlet port. In addition, means is provided for actuating the valve means suddently to move the valve means to open the outlet port to allow the pressurized gas in the chamber to be released rapidly into the water to generate an acoustic pulse.

In addition, means is provided for decelerating the valve at the end of its opening movement. Also a retract arrangement is provided for retracting the valve to its closed position following the generation of an acoustic pulse as well as a second deceleration device for decelerating the valve at the end of its closing movement. The retract arrangement and at least the second deceleration device are located within the tubular structure of the valve.

The retract and deceleration arrangements are all built around a central member which extends into the tubular structure of the valve and which is supported rigidly with respect to the outer wall structure of the chamber. The central member includes structure forming a retract chamber within the tubular structure of the valve. An interior piston is rigidly coupled to the valve and movable therewith. This interior piston is supported for movement within the retract chamber. Means is provided for supplying gas to the retract chamber for moving the valve to its closed position following the generation of an acoustic pulse.

The deceleration arrangement for decelerating the valve at the end of its opening movement comprises structure formed on the valve and on the central member, respectively, both exposed to water. The structure formed on the valve is movable toward that formed on the central member upon movement of the valve toward the open position whereby water is forced from between the two structures to decelerate the valve after the outlet port is opened.

A similar arrangement is provided for decelerating the valve near the end of its closing movement; however, this arrangement is located well within the tubular structure of the movable valve. The second deceleration arrangement comprises structure formed on the central member which cooperates with structure formed on the interior piston, the latter structure of which moves toward the former, upon movement of the valve toward its closed position. Since both of these two structures are exposed to water, water is forced from between the structures to decelerate the valve near the end of its closing movement.

In the embodiment disclosed, each of the deceleration members comprises tapered structure formed on the rigidly supported central member and on the structure forming the interior retract piston, respectively, whereby a constant pressure, variable orifice is provided to obtain uniform deceleration to avoid undue stresses on the valve.

In the embodiment disclosed, the valve comprises a spool-shaped valve having a port release rim which is employed for opening and closing the outlet port and another rim which is employed for control purposes. The tubular member interconnects the two rims. This member and the control rim are supported for movement within the outer wall structure defining the chamber of the source. In the closed position of the valve, the control rim cooperates with a seal to form a control region sealed from the high gas pressure in the main chamber. Actuation of the valve is accomplished by increasing the pressure in the control region to move the valve to a position to disengage the seal. At this point high gas pressure in the main chamber acts on both sides of the control rim to nullify the pressure forces on this rim thereby putting a net force on the release rim to move the valve rapidly to an open position to release the high pressure gas into the water for generating an acoustic pulse.

In one embodiment, high pressure gas in the chamber is formed by injecting compressed air and diesel fuel into the chamber to form a combustible mixture of gases which is ignited by a plurality of igniters provided in the chamber. Upon ignition hot gases of high pressure are formed and as the pressure increases to a peak value, the valve is rapidly moved to an open position to release the pressurized gas into the water to generate an acoustic pulse. In this embodiment, the interconnecting tubular member of the valve is cooled by direct contact with the water located therein. The port release rim also is cooled by direct contact with the water. The control rim within the chamber is cooled by directing cool air, used to form the combustible mixture, onto the interior surface of this rim.

The diesel fuel is sprayed into the chamber by a plurality of fuel injectors located around the interior periphery of the chamber. Fuel is fed to these injectors by an encircling manifold having a plurality of T members coupled thereto and leading to the fuel injectors. A second manifold including a plurality of T members also is provided for injecting lubricating oil into the chamber for lubricating the port release rim which in effect is a piston supported for sliding movement within a cylinder extending from the chamber to form the outlet port. As mentioned above, upon release of the pressurized gas from the chamber a shock wave of high magnitude is generated. In the early development of this source the manifolds tended to break, particularly at the joints of the T members. It is believed that this was due to the shock wave generated. This problem was solved by providing clamps secured to the chamber and to the manifolds on each side of the T members and adjacent thereto.

In the operation of the source, the control region is vented during the chamber filling and pressure forming period. This is done in order to prevent high pressure gases, leaking into the control region, from prematurely actuating the valve. Venting is controlled by a shuttle valve arrangement. A valve triggering arrangement is employed and comprises a sepaarte supply of air which is applied to the control region by way of the same shuttle valve arrangement. Normally the shuttle valve is biased to a position to allow the contro lregion to be vented to the water. When it is desired to actuate the valve to release the gas from the chamber, air from the separate supply is applied to the shuttle valve to move it to a position to close the vent and then allow the air from the separate supply to be applied to the control region for triggering purposes.

BRIEF DESCRIPTION OF THE DRAWINGS

FIGURE 3 is a cross-sectional view of the acoustic source with some of the interior and exterior equipment omitted and showing primarily the structure of the quick-acting valve;

FIGURE 7 is an enlargement of a portion of the structure of FIGURE 3;

FIGURE 8 is a detailed exterior view of the top of the acoustic source;

FIGURE 9 is an enlarged cross section of FIGURE 3 taken along the lines 9—9;

FIGURE 11 is an enlargement of a portion of the structure of FIGURE 3;

FIGURE 13 is a reduced cross section of FIGURE 12 taken along the lines 13—13 with the elastomer seal removed;

FIGURE 14 is an enlarged cross-sectional view of FIGURE 8 taken along the lines 14—14;

FIGURE 15 illustrates the passageways and apertures formed in one of the crescent-shaped members shown in FIGURE 8;

FIGURE 16 is an enlarged cross section of FIGURE 8 taken along the lines 16—16;

FIGURE 17 is a cross section of FIGURE 16 taken along the lines 17—17;

DETAILED DESCRIPTION OF THE INVENTION

Figure 1:
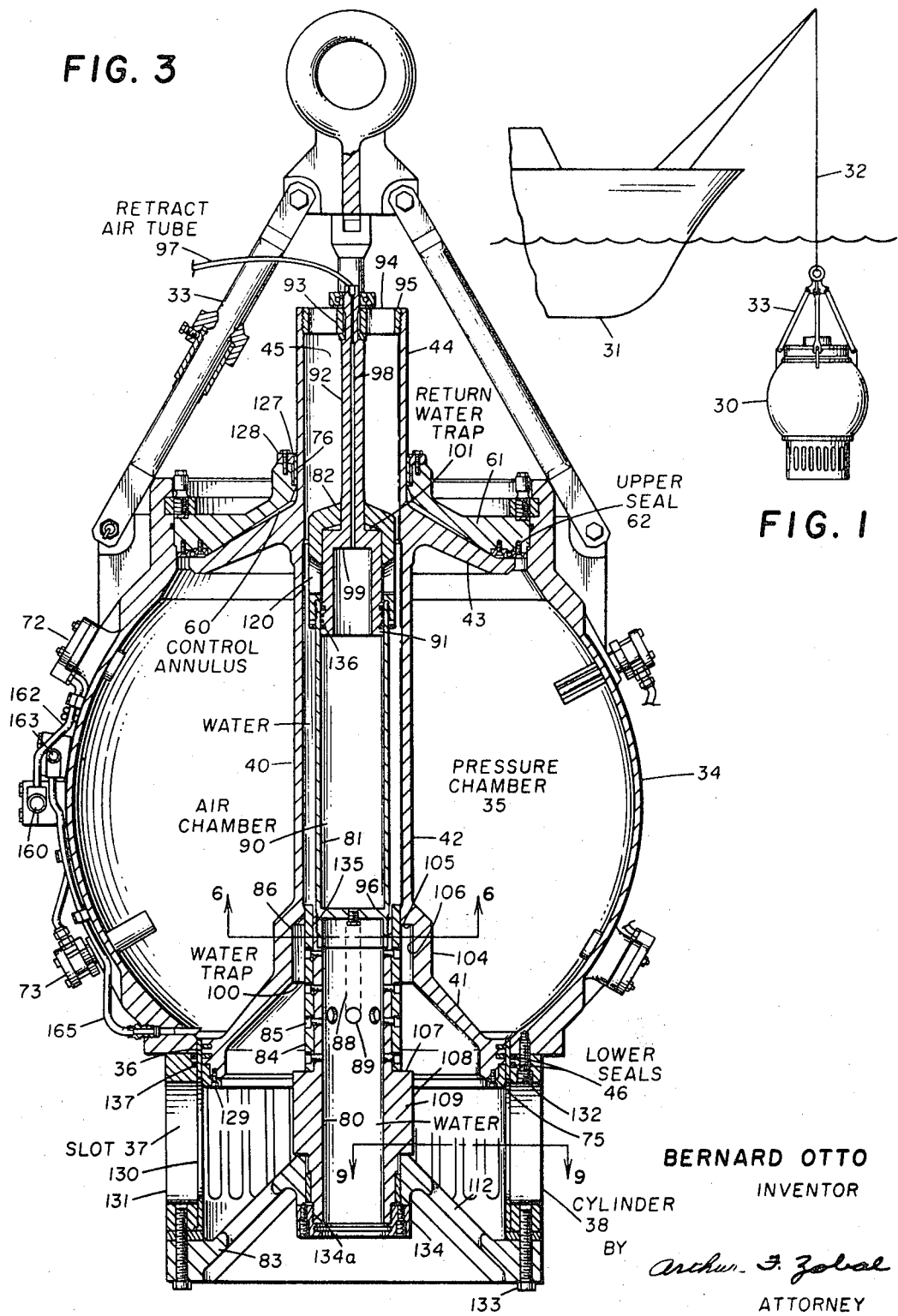
FIGURE 1 illustrates the acoustic source of the present invention in the environment in which it is to be used.
Figure 2:
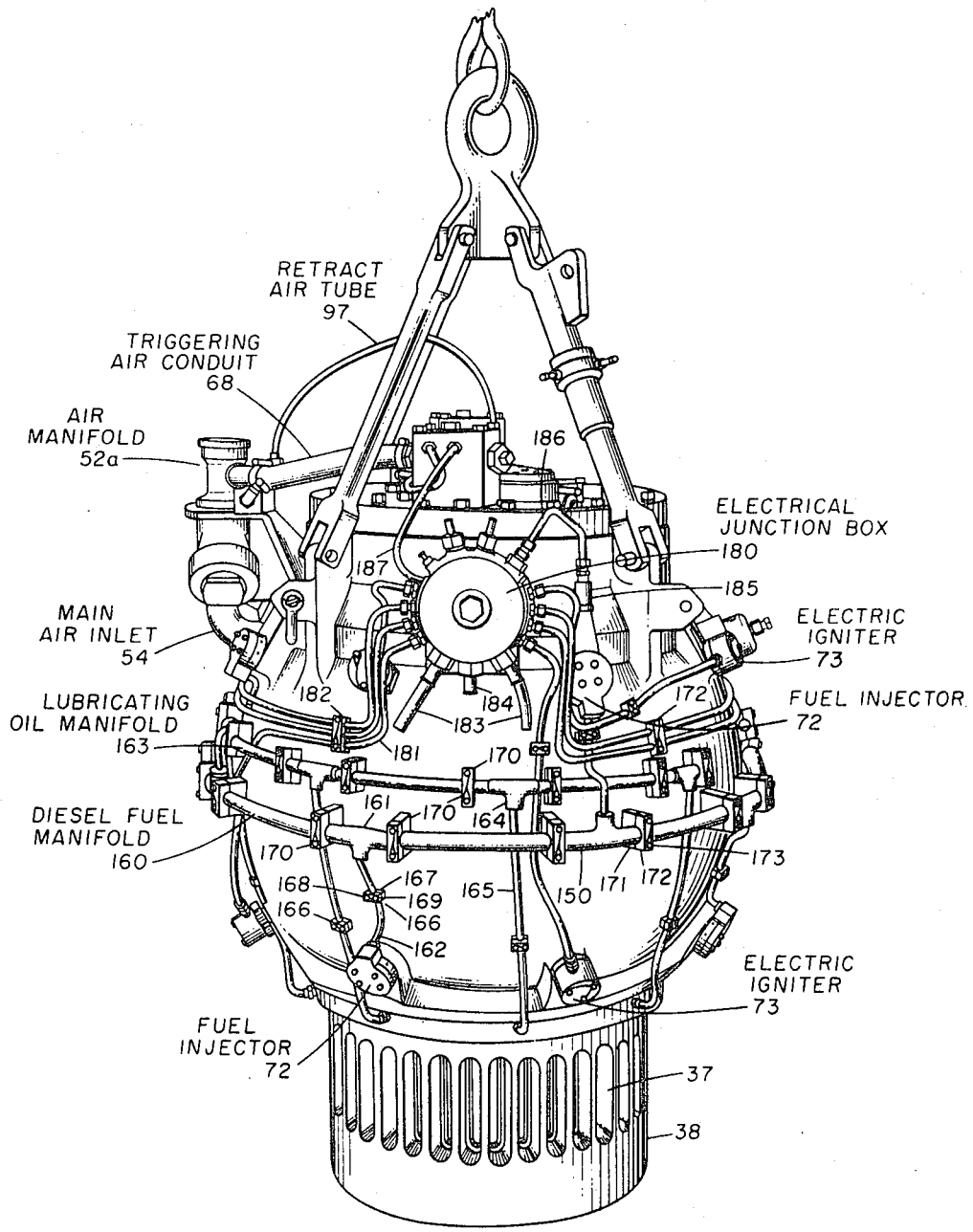
FIGURE 2 is a detailed exterior view of one side of the acoustic source.

Referring now to FIGURE 1, the acoustic source 30 to which the present invention is directed is shown supported in water from a boat 31 by a cable arrangement 32 and supporting arms 33. A detailed exterior view of the source 30 is shown in FIGURE 2. As can be seen from the cross-sectional view of FIGURE 3, the acoustic source comprises enclosing wall structure 34 forming a pressure chamber 35 and which has an outlet port at the lower end to be coupled to water. The outlet port comprises aperture 36 formed at the lower end of enclosing wall structure 34 and a plurality of laterally extending slots 37 extending through cylinder 38. A quick-opening, spool-shaped valve 40 is provided for opening and closing the outlet port. When the valve is in a closed position the chamber is pressurized with high gas pressure. At a desired time the valve 40 is actuated for sudden downward movement to allow the high pressure gas to escape rapidly into the water by way of the outlet port to generate an acoustic pulse.

Figure 4:
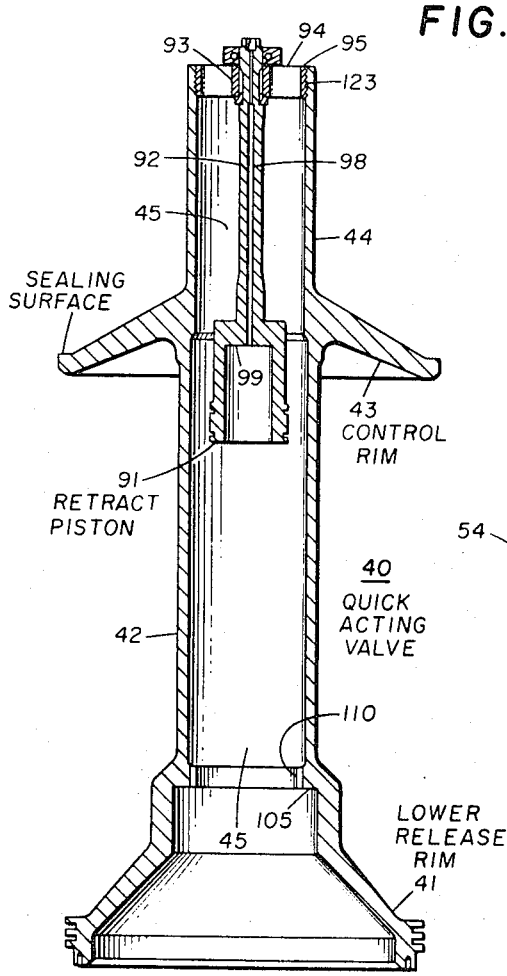
FIGURE 4 is a cross-sectional view of the quick-acting valve employed for releasing the pressurized gas from the main chamber of the source.
Figure 5:
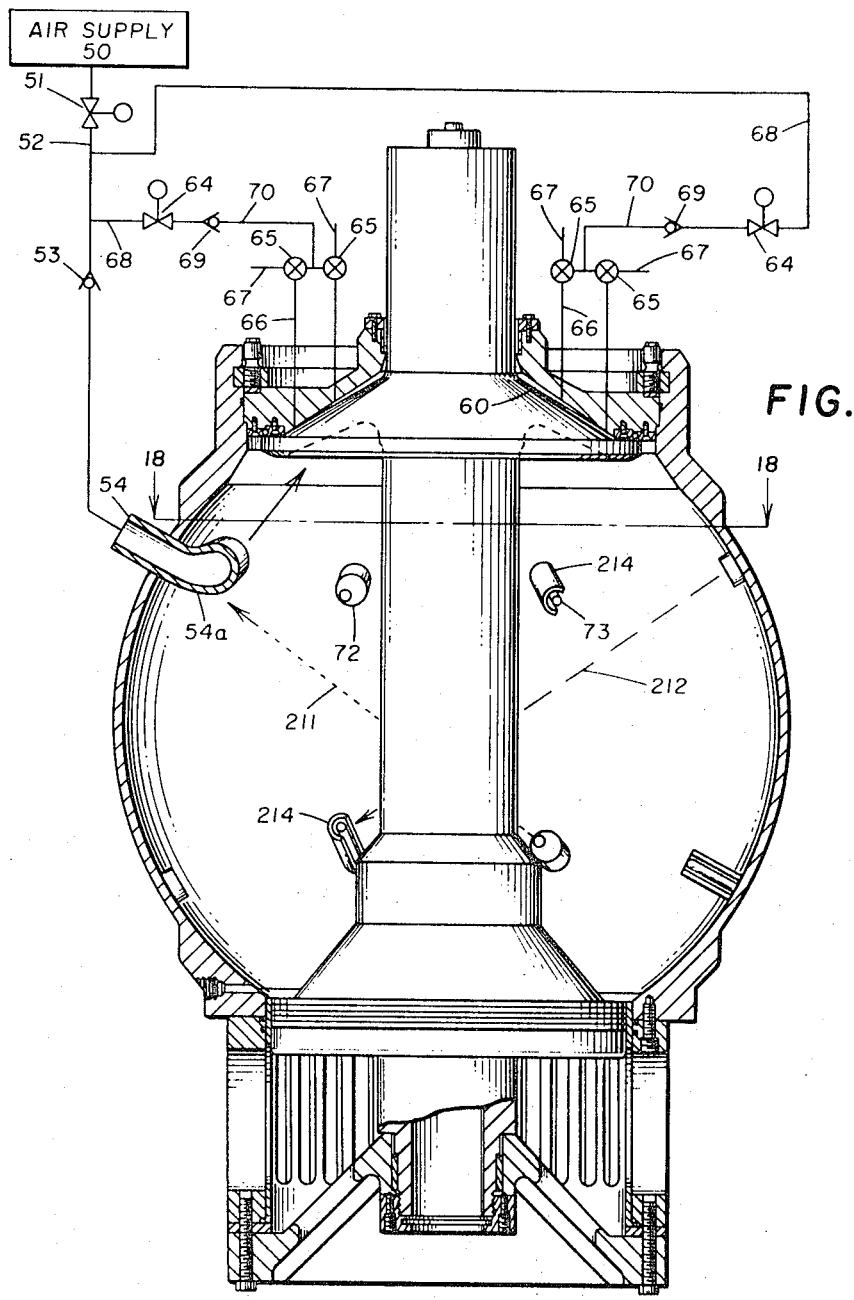
FIGURE 5 is a cross-sectional view of the source showing a side view of the quick-acting valve pressure in the chamber, interior equipment, and a schematic illustration of the instrumentation employed for operating the source.

A brief description of the quick-acting valve 40 and the manner of its operation in the source 30 now will be given. As illustrated in FIGURES 3–5, valve 40 comprises a lower release piston or rim 41, interconnecting tubular member 42, and an upper or valve control rim 43. Tubular member 42 has an upper extension 44 and an aperture 45 extending axially therethrough. The valve 40 is supported for axial movement from a closed position as shown in FIGURE 3 to a downward open position whereby lower rim 41 is positioned near the lower end of cylinder 38. When the valve 40 is moved to a closed position, the outlet port is sealed by lower piston ring seals 46 coupled to lower rim 41. In this position the chamber 35 is pressurized by an arrangement including an air supply 50, solenoid actuated valve 51, conduit 52, check valve 53, and main air inlet 54 (see FIGURE 5).

In addition, in the valve's closed position a control annulus 60 is formed between the top surface of control rim 43 and the upper chamber structure 61 of the source. Upper seal 62, coupled to chamber structure 61, contacts the upper surface of control rim 43 to seal the annulus from the high gas pressure in the main chamber 35. Annulus 60 normally is maintained at a low pressure when the valve 40 is closed by an arrangement including normally closed solenoid valves 64 and shuttle valves 65 which vent annulus 60 to the water by way of passageways 66, valves 65, and vents 67 (see FIGURE 5). The area of the control rim 43 within the upper seal 62 is greater than the area of release rim 41 within lower seal 46. Thus, a net upward force is applied to the quick-opening valve maintaining it in a closed position as the chamber 35 is pressurized.

The fast-acting valve 40 is actuated to release the pressurized gas from the chamber by increasing the pressure in control annulus 60. This is done by simultaneously opening solenoid valves 64, of a dual triggering system, to allow air to flow from conduit 52 to valves 65 by way of conduits 68, valves 64, check valves 69, and passageways 70. The air causes shuttle valves 65 to close vents 67 for flow to annulus 60 through passageways 66. The increase in pressure in annulus 60 causes valve 40 to move downward to a position where the top surface of the control rim 43 disengages the upper seal 62. When this occurs, the high gas pressure in the chamber 35 acts upon the top surface of the control rim 43 to upset the balance of force and rapidly move the quick-opennig valve 40 downwardly to allow the high gas pressure in the chamber 35 to be released immediately into the water by way of aperture 36 and slots 37 to generate an acoustic pulse.

In one embodiment, the pressure chamber 35 may be pressurized by injecting only pressurized air into the chamber for release into the water. In another embodiment, the pressure chamber 35 is pressurized by injecting or forming a combustible fluid or mixture in the chamber which is ignited and burned to form hot gases of high pressure. In the latter embodiment, the arrangement for forming the combustible mixture in the chamber and for igniting the mixture comprises the air inject mechanism described above, a plurality of diesel fuel injectors 72, and a plurality of igniters 73 (see FIGURE 3). This arrangement will be described more thoroughly hereinafter.

In the present source, as mentioned above, the quick-acting valve 40 is supported whereby the tubular interconnecting member 42 forms the interior boundary of the annular pressure chamber 35 and in addition provides a central region, within the aperture 45, extending through the chamber 35 and containing water in which the source is immersed. The water in this region directly contacts the interior walls of the tubular member 42 and hence cools this portion of the valve from the heat generated in the pressure chamber 35 in the embodiment that relies on ignition of combustible gases to form the high gas pressure within the chamber 35. In addition, there is located within the central aperture 45 of the valve 40 a valve retract mechanism and deceleration arrangement, the latter of which uses the water within the aperture 45 for decelerating the valve.

Referring again to FIGURE 3, the arrangement for supporting the quick-acting valve 40 centrally of the exterior wall structure 34 and for movement axially thereof comprises a lower wear ring 75 coupled to the lower rim 41 and an upper bearing member 76 coupled to the upper chamber structure 61. As can be understood, wear ring 75 slides along the inner surface of slotted cylinder 38 during movement of valve 40 while bearing 76 supports and guides the upper extension 44 of the quick-opening valve 40.

Figure 6:
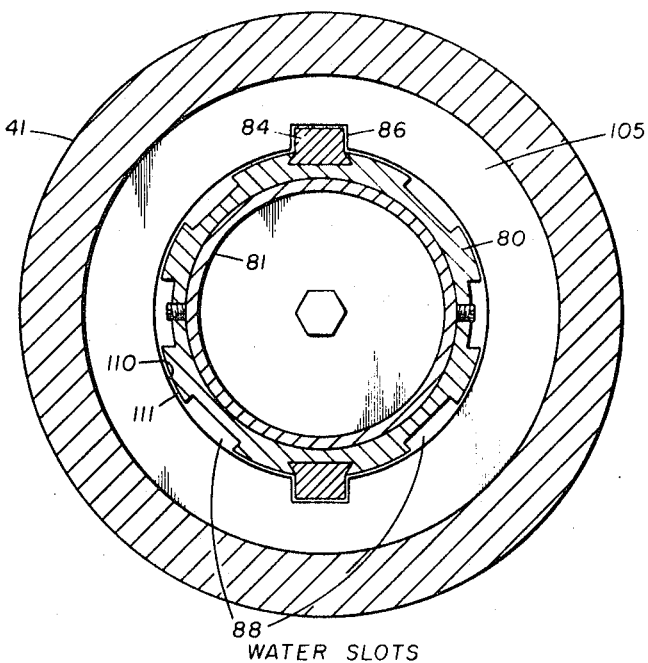
FIGURE 6 is an enlarged cross section of FIGURE 3 taken along the lines 6—6.

Extending centrally of the quick-opening valve 40 and supported rigidly, with respect to the chamber wall structure 34, is a central member. This member comprises central support 80, tubular member 81, and slotted end cap 82 coupled together, respectively, and to the chamber wall structure 34 by way of hub 83 and slotted cylinder 38. Central support member 80 has keys 84 secured thereto by bolts 85 and which cooperate with slots 86 (see FIGURE 6) formed in the interior surface of the valve 40 for guiding the valve in its upward and downward movement to prevent rotation thereof.

The exterior diameters of tubular member 81 and slotted end cap 82 are smaller than the interior diameter of the aperture 45 extending through the quick-opening valve 40 thereby providing a central annular region exposed to and containing water. Water may pass into and out of this region by way of the aperture 45 extending throught he upper extension 44 of the quick-acting valve and by way of water slots 88 formed on the outer periphery of central support member 80. As illustrated in FIGURE 3 and also in FIGURES 6 and 7, these water slots extend from the top portion of member 80 to apertures 89, the latter of which allows water to pass interiorly of member 80 intermediate its ends. Thus, the central water region extends completely through the quick-acting valve 40 when it is in a closed position.

Water within the central region contacts the interior surface of the tubular interconnecting member 42 of the quick-acting valve thereby cooling this member from the hot temperatures generated within the pressure chamber 35. The lower rim 41 also is cooled by direct contact with the water. In order to avoid undue stresses on the valve 40 due to uneven temperatures, the upper rim 43 is cooled by air. As can be seen in FIGURE 5, the air inlet 45, usedto injet air to form the combustible mixture, extends into the chamber 35 and has a curved end 54a pointing toward the position of the upper rim 43. During the air injection cycle, relatively cool air (of the order of 100° F. to 150° F.) is directed onto the upper rim for cooling purposes and also to form the combustible mixture for ignition.

The retract mechanism located within aperture 45 of valve 40 comprises an air chamber 90 formed by the tubular member 80 and, in addition, interior retract piston 91, the latter of which is rigidly coupled to the quick-acting valve 40. As can be seen in FIGURES 3 and 8, retract piston 91 is coupled to the upper extension 44 of the quick-acting valve by way of step 92, rim 93, spokes 94, and rim 95. Thus, the retract piston 91 moves with the quick-acting valve 40 and is supported for sliding movement within the rigidly supported tubular member 81. The lower end of tubular member 81 is closed by end portion 96. Pressurized air is injected into the retract air chamber 90 by way of flexible conduit 97 and aperture 98 extending through stem 92. Thus, following the generation of an acoustic pulse and after the high gas pressure is released from the pressure chamber 35, the pressurized air in the retract chamber acts over the entire surface 99 of the retract piston 91 and moves the piston and hence the quick-acting valve 40 to its closed position. By placing the retract mechanism within the quick-opening valve and hence centrally of the pressure chamber 35, a compact source is provided, thereby facilitaitng handling operations.

The deceleration mechanism comprises a lower water trap region or chamber 100 (FIGURE 3) for decelerating the quick-acting valve 40 at the end of its opening movement and an upper or return water trap region 101 for decelerating the quick-opening valve 40 at the end of its return movement.

Referring to the lower deceleration device, upper end member 104 of the lower rim 41 has interior surfaces 105 and 106 which cooperate with exterior surfaces 107 and 108 of the enlarged cylindrical portion 109 of the central support member 80 to decelerate the valve 40 as the valve moves toward the ends of its downward stroke. The interior diameter of the upper end member 104 is larger than the exterior diameter of cylindrical enlargement 109. Thus, member 104 slides downward and around the cylindrical enlargement 108 forming the chamber 100. Water trapped in this chamber decelerates the valve 40.

There is little if any deceleration of the valve until member 104 of the valve approaches or reaches the surfaces 107 and 108. From that point on uniform deceleration is obtained by providing a variable orifice through which the water escapes from chamber 100. The variable orifice is formed by tapering the peripheral surface 108 of the enlarged portion 109 of the central support member 80, as illustrated more clearly in FIGURE 7. As member 104 of the release rim 41 approaches the cylindrical enlargement 109, the variable orifice formed between the interior surface 106 of member 104 and the tapered surface 108 decreases in cross-sectional size upon further movement of the valve downward. This provides for constant water pressure in the water trap chamber 100 as member 104 traverses the tapered surface thereby providing for uniform deceleration.

Some water does escape upward from chamber 100 between the upper exterior surface of member 80 and the inner surface 110 (FIGURES 4 and 6) of member 104 since a slight clearance 111 (FIGURE 6) is provided to allow free movement of the valve 40 relative to support member 80. This clearance, however, is constant and the passage of water upwardly does not have a detrimental effect on the uniform deceleration desired.

Upon movement of the valve 40 downward, water below the lower rim 41 and trapped in the chamber 100 passes outward and downward by way of slots 37 and apertures 112 formed in connecting hub 83, the latter of which is illustrated more clearly in FIGURE 9.

Figure 10:
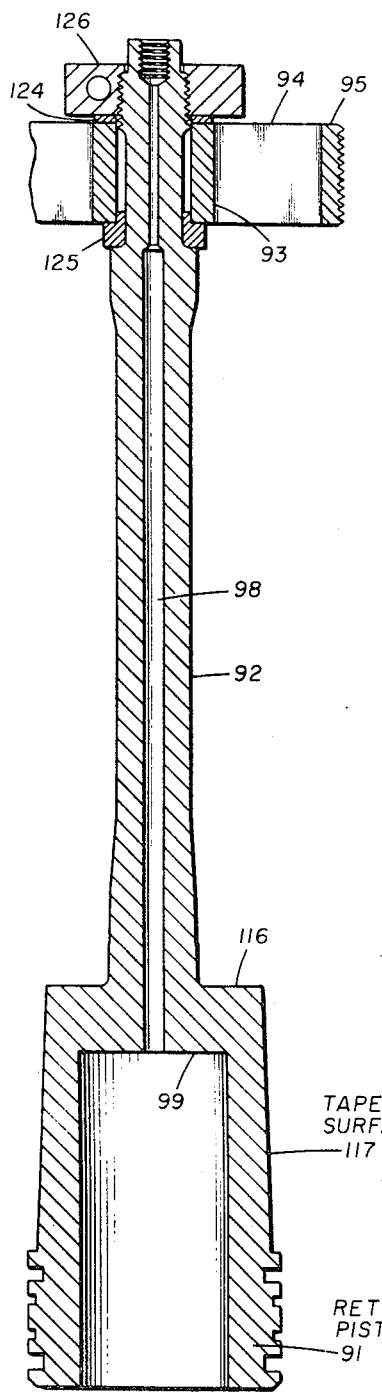
FIGURE 10 is an enlargement of a portion of the structure of FIGURE 3.

In the description of the upper deceleration mechanism, reference will be made to FIGURE 3, FIGURE 10, and FIGURE 11. The upper deceleration device works on a similar principle as that of the lower deceleration device; however, it relies upon coaction between the exterior surfaces 116 and 117 (FIGURE 10) of retract piston 91 and the interior surfaces 118 and 119 (FIGURE 11) of slotted end cap 82 to form chamber 101. Water trapped in this chamber decelerates the piston 91 and hence the quick-acting valve 40 upon movement thereof near the end of its return stroke.

As can be seen in FIGURES 3 and 11, slotted end cap 82 has lateral slots 120 extending through the side wall structure and an aperture 121 extending through the top wall structure. The lower end of cap 82 is threaded onto the top portion of tubular member 81 with stem 92 of the retract piston 91 extending through aperture 121. The interior diameter of end cap 82 is larger than the exterior diameter of retract piston 91 along the exterior surface 117. In addition, the interior diameter of aperture 121 is larger than the exterior diameter of stem 92 whereby retract piston 91 and stem 92 may slide freely upon downward movement of the quick-acting valve 40.

As the quick-acting valve 40 and hence the retract piston 91 moves downwardly, water from the annular water region within the quick-acting valve 40 flows through the laterally extending apertures 120 into the chamber region 101 formed between surfaces 116, 117 of retract piston 81 and surfaces 118, 119 of end cap member 82.

Upon upward movement of the quick-acting valve 40 and the retract piston 91, water trapped within this chamber decelerates the valve. Uniform deceleration is obtained by providing a variable orifice through which the water escapes as the valve 40 and hence the retract piston 91 moves further upward. The variable orifice is obtained by tapering the exterior surface 117 of the retract piston 91 as shown more clearly in FIGURE 10. As the retract piston 91 moves into the end cap 82, a variable orifice which decreases in size, is formed between the tapered surface 117 of retract piston 91 and the interior surface 119 of the end cap member 82. Water trapped within the chamber 101 escapes by way of the variable orifice and the laterally extending apertures 120 as the retract member approaches and reaches the top end of the end cap member 82. The decreasing variable orifice provides for a constant pressure and hence constant deceleration of the quick-acting valve 40 at the end of its return movement. Some of the water leaks upward through the clearance provided between the stem 92 and the aperture 121 of member 82. The clearance is constant, however, and the leakage does not seriously affect the uniform deceleration.

In a further description of the quick-acting valve 40 and its supporting structure, retract piston 91 is coupled to the quick-acting valve 40 by way of inner rim 93, spokes 94, and outer rim 95 as stated above. Outer rim 95 is threaded into upper extension 44 of valve 40 by threaded connections illustrated at 123 in FIGURE 4. As can be seen in FIGURE 10, inner rim 93 is coupled to stem 92 by way of metal sleeves 124, 125, and threaded nut 126. The sleeve 125 has a thickness sufficient to prevent surface 116 of retract piston 91 from contacting top surface 118 (see FIGURE 11) of the slotted end cap 82.

Retract chamber 90 is supplied with air through flexible conduit 97 and movable stem 92 of the piston 91 rather than through the lower rigid end 96 of the chamber 90 to avoid damage to the supply conduit due to the high forces developed at the outlet port of the source. This arrangement also is disclosed and claimed in copending United States patent application, Air Feed Device for Valve Retract System in Pneumatic Acoustic Source, Ser. No. 663,677, filed by Malcolm O. Johnson on Aug. 28, 1967, and assigned to the same assignee as the present invention.

In other features, top bearing 76 is secured to chamber structure 61 by way of ring member 127 and bolts 128 (note FIGURES 3 and 8). Wear ring 75 of the lower rim 41 of the valve 40 is coupled thereto by way of bolts 129. Note FIGURE 3. Slotted cylinder 38 comprises an inner cylinder 130 and an outer cylinder 131 (note also FIGURE 9), the latter of which is coupled to chamber structure 34 by way of bolts 132. Hub 83 is coupled to cylinder 38 by way of bolts 133. Member 80 is secured to hub 83 by cap 134 threaded to member 80 at 134a after member 80 passes through hub 83. Tubular member 81 is threaded onto member 80 at 135. Retract piston 91 has seals 136 located within exterior slots to maintain the air chamber 90 sealed. In addition, O-rings 137 (FIGURE 3) are located in interior slots formed at the top of outer cylinder 131 for providing a seal at this point between cylinders 130 and 131 forming the slotted cylinder 38.

In one embodiment, the pressure chamber 35 has a volume of nine cubic feet. The exterior chamber structure 34 and the quick-acting valve 40 are formed of stainless steel. Stainless steel is also used in the manufacture of member 131 of cylinder 38, hub 83, central support 80, tubular member 81, retract piston 91 and its associated stem 92, as well as the top structure 61 and other peripheral structure of the source. Member 130 of cylinder 38 and end cap 82 are of aluminum bronze. The source 30 without the supporting arms 33 weighs about 1800 pounds, the quick-acting valve 40 weighing about 300 pounds. The diameters of rims 41 and 43 are of the order of 17½ and 18¾ inches, respectively. The interior diameter of the effective sealing element of seal 62 is of the order of 18¼ inches. Tubular member 81 has an outside diameter of the order of 4¼ inches while interconnecting member 42 of valve 40 has an inside diameter of the order of 5½ inches. The source 30 was designed to withstand pressures in the chamber 35 up to 500 p.s.i.

In the embodiment employing diesel fuel, air supply 50 has a capacity sufficient to pressurize chamber 35 up to about 75 or 90 p.s.i. gauge during the filling cycle. Burning of the combustible mixture formed by the injection of diesel fuel increases the chamber pressure therein to much higher values, for example, up to 500 pounds. The pressure generated within the chamber is controllable by the duration of fuel injection, the temperature of the igniters 73, the air pressure injected, etc. In actual operations, pressures of about 300–350 p.s.i. were found satisfactory. In the formation of pressures of this magnitude and higher, the interior gas temperature within the chamber was determined to be about 1700° F. or above.

In operation of the source, acoustic pulses are produced every six seconds. Thus, the time required during each cycle for filling, mixing, burning, actuation, and release of the valve 40, and retraction thereof must be maintained at a minimum. The time rejuired for the control annulus 60 to be filled to a pressure sufficient to move the control rim 43 out of engagement with the top upper seal 62 is of the order of 35–40 milliseconds. From this point on, the time required for the valve 40 to move to an open position is of the order of 10 milliseconds. In the opening movement, the quick-opening valve 40 travels about eight inches and experiences a force up to about 300–600 G's.

Thus as can now be understood, tremendous pressures, forces, and stresses are experienced by the source which created serious problems in its development and construction. Some of the serious problem areas encountered were those relating to the upper seal 62, the peripheral equipment attached to the exterior of the source which tended to break and blow off due, it is believed, to the shock created, the valve triggering arrangement, cavitation at the lower end of the source near the outlet port, and erratic firing problems in the embodiment which employed diesel fuel.

In the development of the acoustic source, it was desired to employ an upper contact seal rather than a sliding seal for forming the control annulus 60 since less time is required to move the quick-acting valve 40 to a position to disengage a contact seal to expose the control annulus 60 following a trigger command. Problems occurred, however, in developing a suitable contact seal. For example, an elastomer seal alone tended to blow out and further had a limited life due to the high temperatures generated within the pressure chamber 35.

As disclosed and claimed in copending United States patent application by Ellis M. Brown et al., Seal for Pneumatic Acoustic Source, Ser. No. 663,664, filed on Aug. 28, 1967, and assigned to the same assignee as the present invention, the problem was solved by providing an elastomer seal cooperating with a metal seal, the latter of which is directly exposed to the high temperatures within the chamber and which contacts the upper rim 43 in the closed position. Presurrized gas also is applied to one side of the elastomer seal for pressure sealing purposes. This pressure is obtained from the chamber 35 and is applied to the top of the elastomer seal by way of a tortuous path formed in the chamber structure for cooling the high gas pressure from the combustion chamber before it is applied to the top of the seal. Thus, a unique arrangement is provided for obtaining an effective seal and protecting the elastomer O-ring from the heat generated within the pressure chamber.

Figure 12:
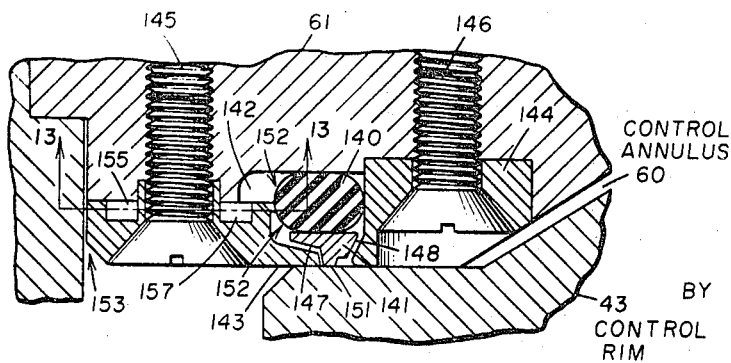
FIGURE 12 is an enlargement of a portion of the structure of FIGURE 3 showing the upper seal arrangement.

Referring to FIGURES 12 and 13 in combination with FIGURE 3, the upper seal 62 will be described in more detail. This seal comprises an elastomer O-ring 140 and a stainless steel ring 141, both of which are located within annular slot 142. Slot 142 is formed by stainless steel holding rings 143 and 144, clamped to the upper structure 61 of the diesel chamber by way of bolts 145 and 146. When the quick-acting valve 40 is moved to an open position, O-ring 140 biases metal ring 141 downward to a position whereby slanting surfaces 147 and 148 of ring 141 sungly contact matching surfaces formed on metal holding rings 143 and 144, respectively, thereby closing the slot 142 and hence protecting the O-ring 140 from hot temperatures within the chamber. In addition, since surfaces 147 and 148 sungly fit against matching surfaces on holding rings 143 and 144, the metal sealing ring141 as well as O-ring 130 is prevented from being blown out or ejected from the slot 142.

When the valve 40 is in a closed position, the lower surface of metal holding ring 144, which extends slightly beyond the lower surface of holding ring 143 (although not shown), prevents further upward movement of the valve. In addition, protruding end 151 of metal ring 141 is contacted by the top surface of control rim 43 and is pushed upward against the pressure of the O-ring 130. Thus, metal ring 141 rather than elastomer O-ring 140 contacts the hot surface of control rim 43 and, in cooperation with overlapping rim 43 and holding rings 143 and 144, shields the O-ring 140 from the high temperature gases generated within the chamber 35.

In addition, when the value 40 is in a closed position and the chamber 35 pressurized, high gas pressure is applied to the exterior side of elastomer O-ring 140 in the direction of the arrows 152. This allows a good seal to be obtained between the O-ring 140 and the upper chamber structure 61, as well as between the O-ring 140 and the wall structure formed by holding ring 144. The displacement of the elastomer O-ring 140, due to the gas pressure acting on its side, is transferred to the metal ring 141. Thus, a good seal is also obtained between elastomer O-ring 140 and the top surface of metal ring 141. In addition, since the bottom surface of metal ring 141 is much smaller than its top surface an increased pressure seal is obtained between its bottom surface and the top surface of control rim 43 for a given pressure within the chamber 35.

The pressurized gas applied to the exterior side of O-ring 140 for sealing purposes is taken from the chamber 35; however, it is applied to the slot 142 by way of tortuous cooling paths illustrated at 153. As can be seen in FIGURES 12 and 13 these paths extend through a labyrinth formed by slots 154, channel 155, slots 156, and channel 157, the latter of which is open to sealing ring slot 142. Holding ring 143 and structure 61 forming the slots and channels act as a heat sink. Thus, the gas in following the various paths to the slot 142 is cooled to a temperature which has little, if any, effect on the elastomer O-ring 140. In one embodiment, there are provided twenty-four equally spaced slots 154 and forty-eight equally spaced slots 156.

The exterior peripheral equipment of the source most affected by shoøk was the diesel fuel and lubricating manifolds, the control valve arrangement for triggering the quick-acting valve, and the electrical connection for the igniters and other instrumentation.

Referring to FIGURES 2, 3, 5, and 8, the diesel source has four fuel injectors 72 and four electric igniters 73 alternately spaced and located at the top of the source. Similarly four fuel injectors 72 and four electric igniters 73 are located alternately at the bottom of the source. The fuel injectors are fed with diesel fuel by an exterior manifold 160, T-members 161, and conduits 162. A lubricating manifold 163 also is employed for applying lubricating oil to the lower piston rim 41 of the quick-acting valve 40 and its associated cylinder 38. Oil is applied to this structure by way of T-members 164 and conduits 165 leading into the interior of the chamber 35 (note FIGURE 3). Conduits 162 and 165 leading to the fuel injectors and to the interior of the chamber for lubricating purposes, respectively, are secured to the exterior of the source by clamps 166. Each clamp 166 consists of a first member 167 welded to the exterior surface of the source and a top member 168 secured by bolts 169 to the bottom member 167 with the conduits located therebetween.

In one of the first sources built, only one clamp was located midway between each T member for clamping the fuel manifold 160 and the lubricating manifold 163 to the exterior of the source. Difficulties were experienced in this arrangement in that the manifolds tended to break at the joints of the T members. Breakage occurred primarily between the vertical portions of the T members and the vertical extending conduits 162 and 163. It is believed that breakage was due to the acoustic pressure waves resulting from the generation of the acoustic pulses. These waves originate below the manifolds at the source's outlet port and have a storng upward traveling component. With the clamping arrangement mentioned above, the T members and manifold portions between the clamps were allowed to bend and flex, thus placing an excessive load particularly on the joints between the vertical portions of the T members and the vertical conduits 162.

The problem of breakage of the joints between the manifold and the T members was solved by placing clamps on each side of the lateral members of the T members and adjacent thereto. These clamps, illustrated at 170, prevent movement between the lateral members of the T members and the manifolds and hence absorb the shock close to the T members thereby preventing breakage at the joints. The unclamped portion of the manifold between the T members is allowed to bend, but since no joints are involved breakage does not occur.

Each of the clamps 170 is similar to the clamps 166 in that each consists of a lower member 171 welded to the source and an upper member 172, bolted to member 171 by bolts 173, with the manifolds secured therebetween.

The electrical connection system comprises an electrical junction box 180 securely fastened to the exterior of the source and having a plurality of connectors located therein. All of the electrical leads for supplying power to the instrumentation of the source extend to or from the box. For example, eight leads extend from this box to the eight igniters. These leads are housed in eight conduits 181 and secured to the exterior of the source by way of clamps 182 which are similar to clamps 166 and 170. Inside the electrical conduit box 180 the eight electrical leads are coupled to electric cables 183 which extend to tow boat 31. Another electrical cable 184 extends from the boat into the conduit box 180 for supplying power to a pressure transducer illustrated at 185 and to the control valve arrangement for triggering the quick-acting valve 40. Power is supplied to pressure transducer 185 and to the control valve arrangement by way of conduits 186 and 187, respectively.

In a description of FIGURES 3 and 5, the valve triggering arrangement was indicated to comprise a dual triggering system including solenoid valves 64, check valves 69, and shuttle valves 65. Referring to FIGURES 8, 14, and 15, a first set of valves 64, 69, and 65 of the dual triggering system is housed in metal block 190 and a second set of valves 64, 69, and 65 is housed in metal block 191. Blocks 190 and 191 each consist of a top member 192 secured to a crescent-shaped member 193, the latter of which is secured to the top of the source. Apertures are drilled and formed in members 192 and 193 to house the valves and to form the conduits or passageways for the passage of air. Triggering air is applied to the blocks 190 and 191 for application to the control annulus 60 by way of conduits 68 extending from the manifold 52a. Solenoid valves 64 in blocks 190 and 191 are energized simultaneously for triggering purposes by way of electrical conduits 187 and 194.

The dual triggering system allows the control annulus 60 to be filled faster, thereby minimizing the time required for actuation of the valve 40 following a triggering command. The various valves of the triggering system are housed in blocks 190 and 191 in order to afford protection against the shock created upon the generation of an acoustic pulse. In addition, the use of blocks 190 and 191 allows compactness of the valve triggering system to be obtained thereby reducing the length of the passageway from the solenoid valves 64 to the control annulus 60. This in turn minimizes the time required for the air to flow from the solenoid valves 64 to the control annulus 60, thereby increasing the firing accuracy in the periodic operation of the source.

The passageways and apertures of the various valves and flow paths formed in members 192 and 193 of the blocks 190 and 191 are illustrated in detail in FIGURES 14 and 15. Each member 192 of blocks 190 and 191 houses a solenoid valve 64 and a check valve 69. The path of the air flow through member 192 is indicated by the dotted line 195. In each crescent-shaped member 193 the air flows in two opposite directions through channel 70 to two shuttle valves 65 located at opposite ends of members 193. The location of the shuttle valves in each member 193 is illustrated in FIGURE 15.

Referring to FIGURES 16 and 17, each valve 65 controls the passage of air through conduits 70 and vent 67, both of which lead to channel 66 which in turn leads to the control annulus 60. Briefly, the shuttle valve 65 is biased normally to a position (to the left in FIGURE 16) to allow the annulus 60 to be vented to the water by way of channel 66 and vent 67. Air flow in channel 70, however, moves the valve 65 to a second position (to the right in FIGURE 17) to close the vent 67 and allow air to flow to the control annulus 60 by way of channel 66 for triggering purposes. Since the vent 67 is closed ahead of the triggering air, the escape of triggering air is prevented thereby optimizing firing time accuracy. Venting during the chamber-filling operations prevents premature firing due to leakage from the chamber 35 to the control annulus 60.

In a more detailed description of the shuttle valve system, each shuttle valve 65 is supported for sliding movement in aperture 200, formed in members 201 and 202 secured together, and to each end of each crescent-shaped member 193. Channel 66 extends from control annulus 60 to aperture 200 which in turn leads to or merges with channel 70 and vent 67. Normally spring 203 biases valve 65 to a position whereby apertures 204 are located over channel 66 and wall member 205 blocks channel 66 from channel 70. Thus, in this position annulus 60 is vented to the water through channel 66, apertures 204, and vent 67. When triggering is desired, actuation of solenoid valves 64 allows air to flow into channel 70 whereby application of pressure on surface 206 of valve 65 moves the valve 65 to the position shown. In this position, the vent 67 is closed and air from channel 70 flows to channel 66 and hence to the control annulus 60 by way of apertures 207 formed in the shuttle valve 65.

Figure 18:
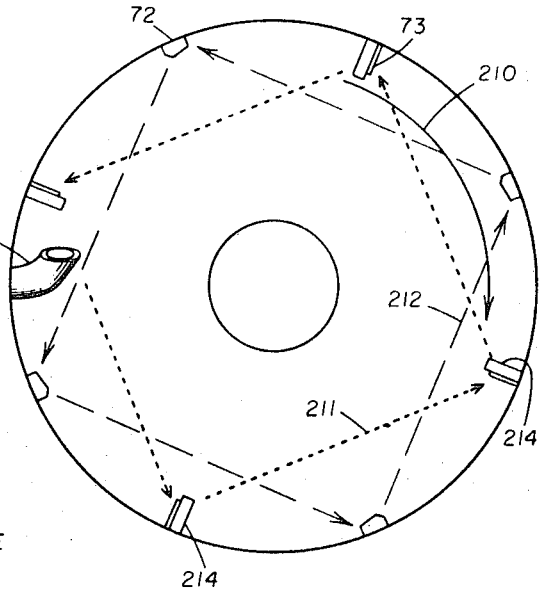
FIGURE 18 illustrates the air inject conduit and the fuel injectors and igniters viewed from the position 18—18 of FIGURE 5 showing only the outline of the exterior structure of the source and the structure of the quick-acting valve.

Referring now to other features of the acoustic source, the main air inlet 54 (see FIGURES 5 and 18) is positioned to direct air into the pressure chamber 35 upward toward the bottom surface of the control rim 43 of the quick-acting valve at one side of the tubular interconnecting member 42. Upon striking the bottom surface of the control rim 43, the air is deflected around the chamber in a clockwise direction and downwardly in a swirling motion. The direction of air flow is indicated in FIGURE 18 by curved arrow 210.

The fuel injectors 72 and the igniters 73 are located at positions whereby diesel fuel from each fuel injector 72 is sprayed toward an associated igniter. In the embodiment disclosed, the four upper fuel injectors 72 spray fuel toward four lower igniters 73, respectively, and the four lower fuel injectors 72 spray fuel toward the four upper igniters 73, respectively. In FIGURES 5 and 18, the upward traveling fuel is indicated by the dotted lines 211 while the downward traveling fuel is indicated by the dashed lines 212. Each associated fuel injector-igniter is positioned whereby the direct line of sight between each pair is offset from the center of the chamber 35 whereby the tubular interconnecting member 42 does not interfere with the diesel fuel sprayed toward the igniters. In addition, the fuel injectors 72 and igniters 73 are located whereby fuel is sprayed from an injector toward an associated igniter in a direction opposite the flow of clockwise air between the injector-igniter pairs in order to enhance mixing of the diesel fuel with the air. In addition, each ignitor 73 has a shield 214 located on one side thereof between the igniter and the air flowing toward the igniter in the clockwise direction. These shields are provided to shield or protect the igniters from the cooler air injected into the chamber. Since the air is injected in one direction and fuel is injected in the other direction, the shields do not interfere with the fuel sprayed toward each igniter but do prevent the cooler air from cooling the igniters, thereby avoiding erratic firing of the source. This combination is disclosed and claimed in copending United States patent application, Fuel Mixing and Ignition System in Pneumatic Acoustic Source, Ser. No. 663,663, filed by George B. Loper on Aug. 28, 1967, and assigned to the same assignee as the present invention.

Figure 19:
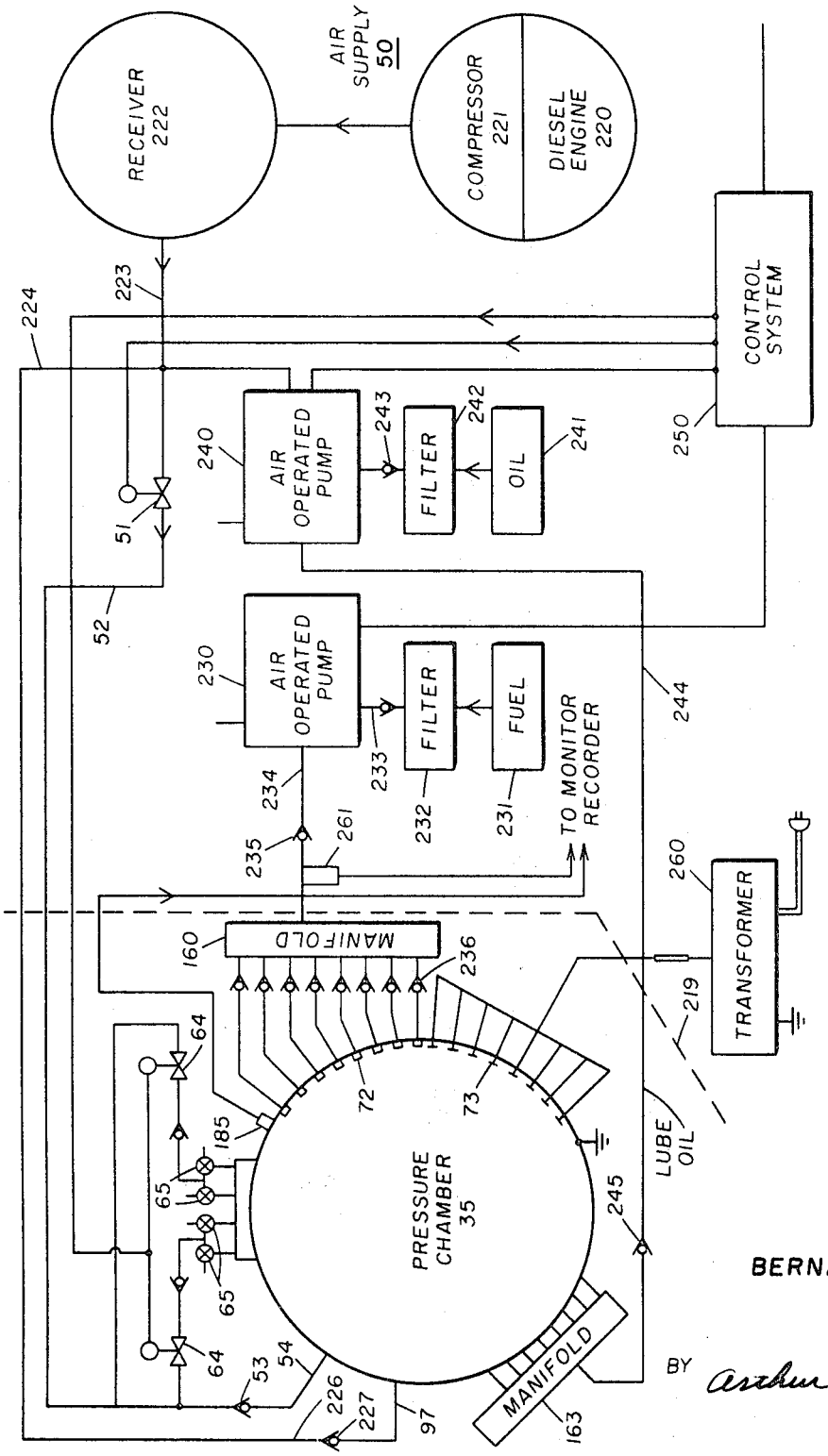
FIGURE 19 is a schematic diagram of the acoustic source and instrumentation used to control the source.

Referring now to FIGURE 19, a brief description will be given in the manner that the source and associated equipment operate to produce periodic pulses of acoustic energy in the water. In the figure, the system to the left of dashed line 219 is towed in the water during seismic operations, while the equipment to the right of dashed line 219 is located and supported on the tow boat. The air supply 50 comprises a diesel engine 220, a compressor 221, and a receiver 222. The output of this receiver is coupled to the acoustic source by way of conduit 223, solenoid controlled valve 51, and conduit 52 which has an internal diameter of two inches. Air for retracting the quick-acting valve is continuously applied to the air retract chamber 90 by way of conduit 224, check valve 227, and flexible conduit 97. The arrangement for applying diesel fuel ot the manifold 160 comprises an air-operated pump 230 coupled to a fuel supply 231 by way of filter 232 and check valve 233. Pump 230 applies fuel to manifold 160 by way of conduit 234 and check valve 235. Check valves 236 are provided between the manifold 160 and the diesel fuel injectors 72. The arrangement for applying lubricating oil to the lower piston of the quick-acting valve comprises a second air-operated pump 240 coupled to an oil supply 241 by way of filter 242 and check valve 243. Pump 240 applies lubricating oil to the lubricating oil manifold 163 by way of conduit 244 and check valve 245.

An electrically operated control system 250 sequentially controls solenoid-actuated valves 51 and 64 and, in addition, air-operated pumps 230 and 240 during each cycle of operation for the production of an acoustic pulse. For example, assuming that the quick-acting valve 40 is in a closed position, control system 250 applies a signal to valve 51 to open this valve for a short period of time to allow high pressure air from receiver 222 to be applied into the pressure chamber 35. During the filling operation, control system 250 also operates air-operated pump 240 to pump lubricating oil into the chamber for a short period of time. Pump 240 then is inactivated and valve 51 cut off after the chamber has been filled with air. Next, control system 250 actuates pump 230 to inject diesel fuel into the pressure chamber for a short period of time. Igniters 73 are continuously energized by power applied thereto from transformer 260. Thus as soon as diesel fuel is injected into the chamber to form the combustible mixture, ignition thereof starts and continues until a predetermined time period (when the pressure no longer rises) when control system 250 actuates solenoid-operated valves 64 for a short period of time to allow air in conduit 52 to be applied to the control annulus 60 to actuate the quick-acting valve 40 for releasing the high pressure gas from the pressure chamber 35 into the water to generate an acoustic pulse. After the high pressure gas is released into the water the low pressure air applied to retract chamber 90 retracts the valve 40 to its closed position and the cycle is repeated.

In one embodiment, with a two-inch line 52 from supply 50, solenoid valve 51 is opened for a period of about two seconds during each filling cycle for injecting air into the chamber 35. Pressure-operated pump 240 is operated effectively for about one second during the filling cycle for injecting lubricating oil. Diesel fuel pump 230 is operated effectively for about 0.5 second following the filling cycle for injecting diesel fuel. In addition, solenoid-operated valves 64 may be opened for about 0.5 second to allow air to be injected into the control annulus 60.

As indicated previously, a pressure transducer 185 is employed to monitor the pressure within the pressure chamber 35 while a pressure detector 261 is employed to monitor the pressure of the diesel fuel injected into the chamber.

In the event that only pressurized air is injected into the chamber 35 for release into the water for generating acoustic sources, the fuel injectors 72 and igniters 73, including their associated equipment, may be omitted. The remaining equipment including the air supply 50 for injecting compressed air into the chamber 35, the dual triggering system, the valve retract system, and the lubricating oil injectors, including their associated equipment, would be retained. The cycle of operation would remain the same except for the injection of diesel fuel into the chamber 35 and burning of the combustible mixture.

What is claimed is:

1. An acoustic source for generating acoustic pulses for exploratory purposes while immersed in a body of water comprising:
   an annular chamber formed by outer wall structure to be immersed in water,
   said chamber having an outlet port for releasing pressurized gas from said chamber,
   valve means for opening and closing said port,
   said valve means including a tubular member,
   means for supporting said tubular member for extension centrally of said outer wall structure for forming the inner wall structure of said chamber when said valve means is in a closed position,
   the interior of said tubular member being directly exposed to water when said source is immersed in water,
   means for introducing a fluid into said annular chamber when said valve means is in a closed position to form a high gas pressure in said chamber greater than the hydrostatic pressure of the water at said outlet port,
   means for actuating said valve means suddenly to move said valve means to open said outlet port to allow the pressurized gas in said chamber to be released rapidly from said chamber to generate an acoustic pulse in water, and
   means supported within said tubular member for moving said valve means to a closed position following the generation of an acoustic pulse.

2. An acoustic source for generating acoustic pulses for exploratory purposes while immersed in a body of water comprising:
   an annular chamber formed by outer wall structure to be immersed in water,
   said chamber having an outlet port for releasing pressurized gas from said chamber,
   valve means for opening and closing said port,
   said valve means including a tubular member,
   means for supporting said tubular member for extension centrally of said outer wall structure for forming the inner wall structure of said chamber when said valve means is in a closed position,
   the interior of said tubular member being directly exposed to water when said source is immersed in water,
   means for introducing a fluid into said annular chamber when said valve means is in a closed position to form a high gas pressure in said chamber greater than the hydrostatic pressure of the water at said outlet port,
   means for actuating said valve means suddenly to move said valve means to open said outlet port to allow the pressurized gas in said chamber to be released rapidly from said chamber to generate an acoustic pulse in water,
   means for moving said valve means to a closed position following the generation of an acoustic pulse, and
   means within said tubular member for decelerating said valve means.

3. An acoustic source for generating acoustic pulses for exploratory purposes while immersed in a body of water comprising:
   an annular chamber formed by outer wall structure to be immersed in water,
   said chamber having an outlet port for releasing pressurized gas from said chamber,
   valve means for opening and closing said port,
   said valve means including a tubular member,
   means for supporting said tubular member for extension centrally of said outer wall structure for forming the inner wall structure of said chamber when said valve means is in a closed poistion,
   the interior of said tubular member being directly exposed to water when said source is immersed in water,
   means for introducing a fluid into said annular chamber when said valve means is in a closed position to form a high gas pressure in said chamber greater than the hydrostatic pressure of the water at said outlet port,
   means for actuating said valve means suddenly to move said valve means to open said outlet port to allow the pressurized gas in said chamber to be released rapidly from said chamber to generate an acoustic pulse in water,
   means supported within said tubular member for moving said valve means to a closed position following the generation of an acoustic pulse, and
   means within said tubular member for decelerating said valve means.

4. An acoustic source for generating acoustic pulses for exploratory purposes while immersed in a body of water comprising:
   an annular chamber formed by outer wall structure to be immersed in water,
   said chamber having an outlet port for releasing pressurized gas from said chamber,
   valve means for opening and closing said port,
   said valve means including a tubular member,
   means for supporting said tubular member for extension centrally of said outer wall structure for forming the inner wall structure of said chamber when said valve means is in a closed position,
   the interior of said tubular member being directly exposed to water when said source is immersed in water,
   means for introducing a fluid into said annular chamber when said valve means is in a closed position to form a high gas pressure in said chamber greater than the hydrostatic pressure of the water at said outlet port,
   means for actuating said valve means suddenly to move said valve means to open said outlet port to allow the pressurized gas in said chamber to be released rapidly from said chamber to generate an acoustic pulse in water,
   a central member extending into said tubular member,
   means for supporting said central member rigidly with respect to said outer wall structure,
   said central member including structure forming a retract chamber within said tubular member,
   interior piston means rigidly coupled to said valve means and movable therewith,
   said interior piston means being supported for movement within said retract chamber, and
   means for supplying gas to said retract chamber for moving said valve means to its closed position following the generation of an acoustic pulse.

5. The acoustic source of claim 4 wherein:
   said valve means and said central member include separate structural means, respectively, exposed to water when said source is immersed in water,
   said structural means of said valve means being movable toward said structural means of said central member upon movement of said valve means toward said open position whereby water is forced from between said separate structural means to decelerate said valve means near the end of its opening movement.

6. The acoustic source of claim 4 wherein:
   said interior piston and said central member include separate structural means, respectively, located within said tubular member and exposed to water within said tubular member when said source is immersed in water,
   said structural means of said interior piston being movable toward said structural means of said central member upon movement of said valve means to said closed position whereby water is forced from between said separate structural members to decelerate said valve means near the end of its closing movement.

7. The acoustic source of claim 4 wherein:
   said central member and said valve means include first and second structural means, respectively, exposed to water when said source is immersed in water,
   said second structural means being movable toward said first structural means upon movement of said valve means to said opened position whereby water is forced from between said first and second structural means to decelerate said valve means near the end of its opening movement,
   said central member and said interior piston including third and fourth structural means, respectively, located within said tubular member and exposed to water within said tubular member when said source is immersed in water,
   said fourth structural means being movable toward said third structural means upon movement of said valve means to said closed position whereby water is forced from between said third and fourth structural means to decelerate said valve means near the end of its closing movement.

8. The acoustic source of claim 7 wherein:
   said chamber having a first end with said outlet port spaced therefrom,
   said valve means including a release element for opening and closing said outlet port,
   said tubular member being rigidly coupled to said release element and having two open ends for allowing water to extend therethrough centrally of said annular chamber,
   said valve means being movable from said first end to said open position and toward said first end to said closed position,
   said central member extending into said tubluar member through said release element.

9. The acoustic source of claim 8 wherein:
   said first and third structural means of said central member include tapered surfaces cooperative with said second and fourth structural means to form variable orifices to obtain uniform deceleration of said valve.

10. The acoustic source of claim 9 comprising:
    means for introducing a combustible fluid into said annular chamber, and
    means for igniting said combustible fluid to form hot gases of said pressure in said annular chamber.

11. An acoustic source for generating acoustic pulses for exploratory purposes while immersed in a body of water comprising:
    a chamber formed by outer wall structure,
    said chamber having a first end and an outlet port spaced therefrom to be coupled to water,
    valve means including a release element for opening and closing said outlet port,
    said valve means including an elongated structural member rigidly coupled to said release element and extending therefrom,
    said valve means having an aperture extending through said release element and through said elongated member in the longitudinal direction, means for supporting said elongated member for extension centrally of said outer wall structure for forming the inner wall structure of said chamber when said valve means is in a closed position, the interior surface of said aperture formed in said elongated member being directly exposed to water when said source is immersed in water thereby providing a central region through said chamber for containing water, means for introducing a fluid into said chamber when said valve means is in a closed position to form a high gas pressure in said chamber greater than the hydrostatic pressure of the water at said outlet port, means for actuating said valve means suddenly to move said valve means to open said outlet port to allow the pressurized gas in said chamber to be released rapidly into the water to generate an acoustic pulse, and means supported within said aperture formed through said elongated member for moving said valve means to a closed position following the generation of an acoustic pulse.

12. The acoustic source of claim 11 including:
means located within said aperture for decelerating said valve means.

13. The acoustic source of claim 12 comprising:
means for introducing a combustible fluid into said annular chamber, and
means for igniting said combustible fluid to form hot gases of said pressure in said annular chamber.

14. An acoustic source for generating acoustic pulses in water for exploratory purposes comprising:
a chamber having a first end, a spaced second end, and enclosing wall structure therebetween forming said chamber,
said first and second ends having apertures extending therethrough,
cylinder means extending from said aperture in said second end forming an outlet port,
valve means including a release piston slidable in said cylinder for opening and closing said outlet port,
said valve means including structural means rigidly coupled to said release piston and extending to said first end of said chamber,
said structural means having a portion extending through said aperture in said first end,
bearing means coupled to said first end outside of said chamber region and cooperative with said portion of said structural means extending through said aperture for providing a first support for said valve means,
bearing means coupled to said release piston and cooperative with said cylinder for forming a second support for said valve means,
said valve means being movable from said first end to an open position and toward said first end to a closed position,
means for introducing a fluid in said chamber when said valve means is in a closed position to form a high gas pressure in said chamber greater than the hydrostatic pressure of the water at said outlet port,
means for actuating said valve means suddenly to move said valve means to open said outlet port to allow the pressurized gas in said chamber to be released rapidly into the water to generate an acoustic pulse,
said valve means having an aperture extending through said release piston and said structural means forming a region extending through said chamber which is exposed to and contains water when said source is immersed in water,
the interior surface of said structural means forming said aperture being directly exposed to water when said source is immersed in water, and
means located within said aperture for moving said valve means to said closed position following the generation of an acoustic pulse.

15. An acoustic source for generating acoustic pulses in water for exploratory purposes comprising:
a chamber having a first end, a spaced second end, and enclosing wall structure therebetween forming said chamber,
said first and second ends having apertures extending therethrough,
cylinder means extending from said aperture in said second end forming an outlet port,
valve means including a release piston slidable in said cylinder for opening and closing said outlet port,
said valve means including structural means rigidly coupled to said release piston and extending to said first end of said chamber,
said structural means having a portion extending through said aperture in said first end,
bearing means coupled to said first end outside of said chamber region and cooperative with said portion of said structural means extending through said aperture for providing a first support for said valve means,
bearing means coupled to said release piston and cooperative with said cylinder for forming a second support for said valve means,
said valve means being movable from said first end to an open position and toward said first end to a closed position,
means for introducing a fluid in said chamber when said valve means is in a closed position to form a high gas pressure in said chamber greater than the hydrostatic pressure of the water at said outlet port,
means for actuating said valve means suddenly to move said valve means to open said outlet port to allow the pressurized gas in said chamber to be released rapidly into the water to generate an acoustic pulse,
said valve means having an aperture extending through said release piston and said structural means forming a region extending through said chamber which is exposed to and contains water when said source is immersed in water,
the interior surface of said structural means forming said aperture being directly exposed to water when said source is immersed in water,
central means extending into the aperture formed through said release piston and said structural member,
means for supporting said central means rigidly with respect to said outer wall structure,
said central means including structure forming a retract chamber,
interior piston means rigidly coupled to said valve means and movable therewith,
said interior piston means being supported for movement within said retract chamber, and
means for supplying gas pressure to said retract chamber for moving said valve means to its closed position following the generation of an acoustic pulse.

16. The acoustic source of claim 15 wherein:
said cylinder has a plurality of ports extending laterally thereto for the release of pressurized gas upon movement of said valve means to said open position,
means coupled to said cylinder and to said central means for supporting said central means rigidly with respect to said outer wall structure,
said last-named means having openings for allowing water to move therethrough upon the movement of said release piston to said open position,
said central means and said valve means having first and second structural means, respectively, exposed to water,
said second structural means being movable toward said first structural means upon movement of said valve means to said open position whereby water is forced from between said first and second structural means for decelerating said valve means near the end of its opening movement.

17. The acoustic source of claim 16 wherein:
said interior piston and said central means have third and fourth structural means, respectively, exposed to water,
said third and fourth structural means being located within said aperture of said structural member forming said valve,
said third structural means being movable toward said fourth structural means upon movement of said valve means toward said closed position whereby water is forced from between said third and fourth structural means to decelerate said valve means near the end of its closing movement.

18. The acoustic source of claim 17 including:
means for introducing a combustible fluid into said chamber, and
means for igniting said combustible fluid to form hot gases of high pressure in said chamber, which chamber is formed between the column of water passing through its central portion and the water in which said outer wall structure is immersed.

19. In an acoustic source for generating high energy acoustic pulses in water for exploratory purposes having:
outer wall structure forming a pressure chamber within which there may be developed high gas pressures and including an outlet port means,
valve means for opening and closing said outlet port means,
means for introducing a fluid into said chamber when said valve means is in a closed position to form a high gas pressure in said chamber,
means for actuating said valve means suddenly to move said valve means to open said outlet port to allow the pressurized gas in said chamber to be released rapidly into the water to generate an acoustic pulse, the combination therewith of:
a manifold surrounding the outer wall structure of said source,
said manifold including a plurality of T members each having two ends forming a portion of said manifold and a third end leading to said source,
means for applying fluid to said manifold for supplying fluid to said source by way of said manifold including said T members for operating said source, and
clamping means coupling said manifold to said source,
said clamping means including a clamp coupled to said manifold and to said source adjacent each of said two ends of each T member.

20. The combination of claim 19 wherein:
said means for supplying fluid supplies lubricating fluid for lubricating said source.

21. The combination of claim 19 comprising:
a supply of combustible fluid coupled to said manifold for supplying combustible fluid to said chamber by way of said third ends of said T members, and
means for igniting said combustible fluid to form hot gases of high pressure in said annular chamber.

22. The combination of claim 19 wherein:
said means for applying fluid to said manifold applies lubricating fluid for lubricating said source,
a second manifold surrounding said source,
said second manifold including a plurality of T members, each having two ends forming a portion of said manifold and a third end leading to said source,
means for applying combustible fluid to said manifold for applying combustible fluid to said chamber by way of said second manifold including said T members,
clamping means coupling said second manifold to said source,
said last-named clamping means including a clamp coupled to said second manifold and to said source adjacent each of said two ends of each T member included in said second manifold, and
means for igniting said combustible fluid applied to said chamber to form hot gases of high pressure in said chamber.

23. An acoustic source for generating high energy acoustic pulses in water for exploratory purposes comprising:
said valve means including means coacting with structure forming a chamber, said chamber adapted to be immersed in water and having an outlet port for releasing pressurized gas from said chamber,
valve means movable in a first direction to an open position for opening said port and in an opposite direction to a closed position for closing said port,
means for introducing a fluid in said pressure chamber when said valve means is in said closed position to form a high gas pressure in said chamber,
said valve means including means coacting with structure forming a control region sealed from high gas pressure in said chamber when said valve means is in a closed position,
a passageway leading to said control region,
a flow path for the flow of gas extending to said passageway,
a vent extending to said passageway,
first control valve means supported for movement to first and second positions,
said first control valve means in said first position blocking the flow of gas from said flow path to said control passageway and opening said passageway to said vent for venting said control region,
said first control valve means in said second position blocking said vent from said passageway and allowing gas to pass from said flow path to said passageway and into said control region,
second control valve means coupled to said flow path for normally blocking the flow of gas to said first control valve,
said first control valve being normally maintained in said first position to vent said control region,
said first control valve being movable by gas flowing in said flow path to said second position, and
means for controlling said second control valve to allow gas to flow to said first control valve for closing said vent and allowing gas to pass into said control region for increasing the pressure therein to move said valve means rapidly to an open position to open said outlet port to allow pressurized gas in said chamber to be released rapidly from said chamber to generate an acoustic pulse in water.

24. The acoustic source of claim 23 wherein:
said flow path is coupled to a supply of gas separate from said pressure chamber for supplying gas to said control region.

25. An acoustic source for generating acoustic pulses in water for exploratory purposes comprising:
a chamber to be immersed in water and having a first end, a spaced second end, and enclosing wall structure therebetween forming said chamber, said first and second ends having first and second apertures extending therethrough, respectively,
cylinder means extending from said second aperture in said second end and having laterally extending apertures forming an outlet port,
movable valve means,
said valve means including a tubular member having a release element and a control element rigidly coupled to said tubular member,
said release element and said control element each being located at separate ends of said tubular member and each including structure extending outwardly from said tubular member, said tubular member having a portion extending beyond said release element, said portion of said tubular member being positioned for extension through said first aperture in said first end, said control element being positioned for movement within said chamber and said tubular member being positioned for movement in an axial position within said outer wall structure of said chamber, said release element being positioned for sliding movement in said cylinder for opening and closing said outlet port, bearing means for providing a first support for said valve means between said portion of said tubular member and structure, forming said first end, outside of said chamber region, bearing means for providing a second support for said valve means between structure forming said release element and said cylinder, said valve means being movable to an open position in a direction away from said first end to allow said outlet port to be opened by said release element and movable to a closed position in a direction toward said first end to allow said outlet port to be closed by said release element, said tubular member including said extending portion having an aperture extending therethrough, said tubular member forming the inner wall structure of said chamber when said valve is in said closed position, the inner surface of said tubular member being directly exposed to water when said source is immersed in water, thereby providing a central region through said chamber which contains water, means for introducing a fluid in said chamber when said valve means is in a closed position to form a high gas pressure in said chamber greater than the hydrostatic pressure of the water at said outlet port, and means for actuating said valve means suddenly to move said valve means to open said outlet port to allow the pressurized gas in said chamber to be released rapidly into the water to generate an acoustic pulse.

26. The system of claim 25 comprising:

means for introducing a combustible fluid into said chamber, and means for igniting said combustible fluid to form hot gases of high pressure in said chamber.

27. The system of claim 26 wherein:

said release element has an inner surface which forms a portion of said chamber when said valve means is in a closed position and an outer surface which is directly exposed to water when said valve means is in a closed position, and means for filling said chamber with compressed air, said last-named means being positioned to apply air to the interior surface of said control element when said valve means is in a closed position for cooling said control element.

References Cited

UNITED STATES PATENTS

| | | | |
|---|---|---|---|
| 2,008,844 | 7/1935 | Steiner | 123—41.34 |
| 2,898,084 | 8/1959 | Eckel et al. | 181—.5 |
| 3,249,177 | 5/1966 | Chelminski | 181—.5 |
| 3,379,272 | 4/1968 | Brooks | 181—.5 |
| 3,379,273 | 4/1968 | Chelminski | 181—.5 |

BENJAMIN A. BORCHELT, Primary Examiner

GERALD H. GLANZMAN, Assistant Examiner

PO-1050
(5/69)

UNITED STATES PATENT OFFICE
CERTIFICATE OF CORRECTION

Patent No. 3,467,984      Dated September 23, 1969

Inventor(s) Bernard Otto

It is certified that error appears in the above-identified patent and that said Letters Patent are hereby corrected as shown below:

Column 2, line 5, "suddently" should read --suddenly--.
Column 3, line 42, "sepaarte" should read --separate--;
        line 45, "contro lregion" should read --control region--.
Column 5, line 20, "quick-opennig" should read --quick-opening--.
Column 6, line 6, "he" should read --the--;
        line 22, "air inlet 45" should read --air inlet 54--;
        line 23, "usedto" should read --used to--;
        line 36, "step 92" should read --stem 92--;
        line 47, "moves the piston" should read --moves the piston 91--;
        line 64, "ends" should read --end--.
Column 9, line 4, "rejuired" should read --required--;
        line 42, "Presurrized" should read --Pressurized--.
Column 10, line 73, "storng" should read --strong--.
Column 11, line 52, "values" should read --valves--.
Column 13, line 23, "ot" should read --to--.
Column 16, line 51, "tubluar" should read --tubular--.
Column 18, line 26, "oc-" should read -- co- --.
Column 20, line 13, "said valve means including means coacting with struc-" should read --outer wall structure forming a pressure chamber to be--

SIGNED AND
SEALED
APR 28 1970

(SEAL)
Attest:

Edward M. Fletcher, Jr.
Attesting Officer

WILLIAM E. SCHUYLER, JR.
Commissioner of Patents